Figure 1:
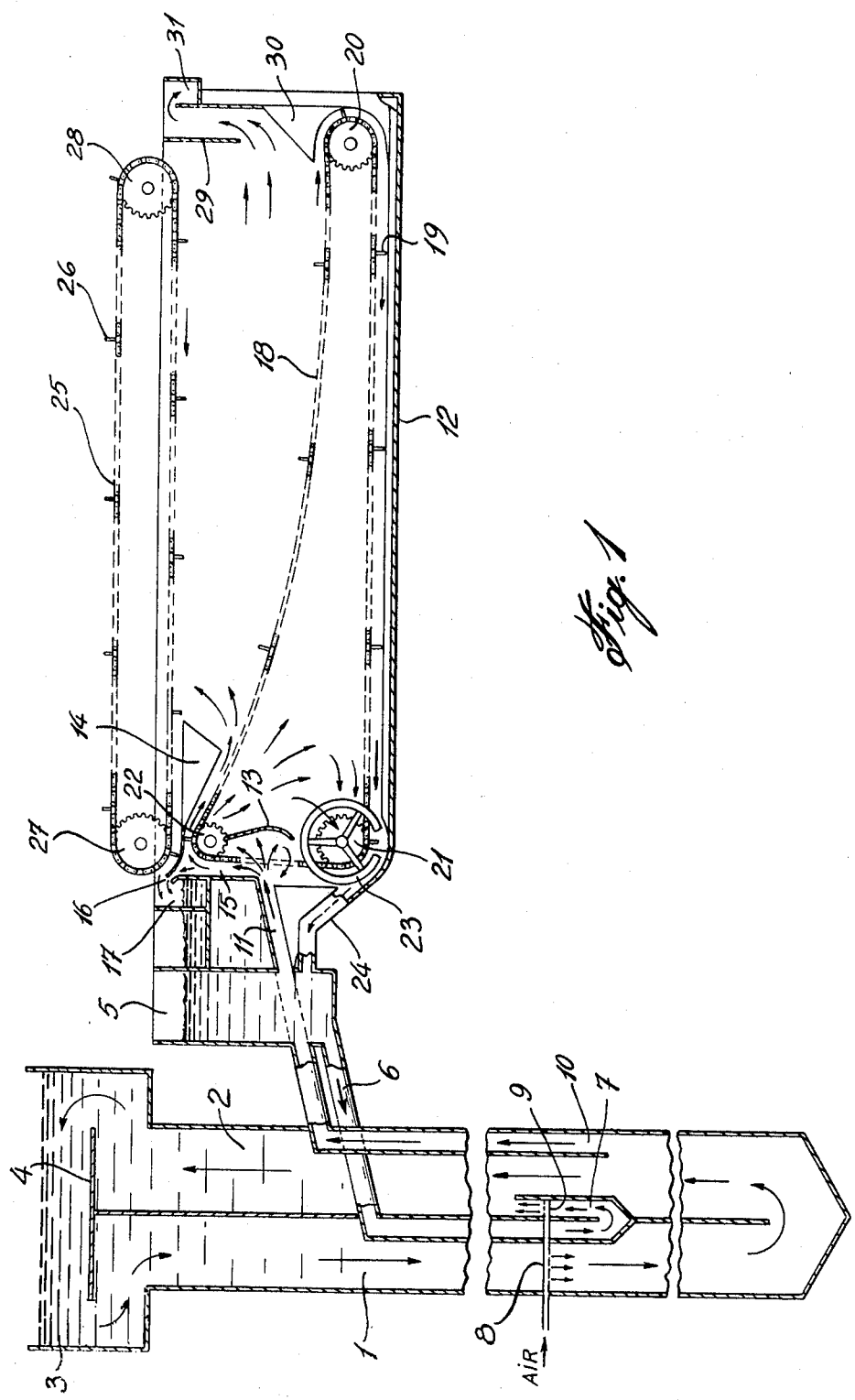

United States Patent [19]

Pollock

[11] 4,279,754

[45] Jul. 21, 1981

[54] MEANS FOR SEPARATION OF GAS AND SOLIDS FROM WASTE MIXED LIQUOR

[75] Inventor: David C. I. Pollock, Richmond Hill, Canada

[73] Assignee: C-I-L Inc., Montreal, Canada

[21] Appl. No.: 159,347

[22] Filed: Jun. 13, 1980

[30] Foreign Application Priority Data

Oct. 26, 1979 [CA] Canada .................................. 338539

[51] Int. Cl.³ .............................................. C02F 3/22
[52] U.S. Cl. ................................. 210/608; 210/625; 210/627; 210/629; 210/195.3; 210/747; 210/170; 261/124
[58] Field of Search ................ 210/608, 620, 621–628, 210/629, 703, 194, 195.1, 195.3, 220, 221.1, 221.3, 170, 747, 257.1, 202; 261/36 R, 124

[56] References Cited

U.S. PATENT DOCUMENTS

| | | | |
|---|---|---|---|
| 2,793,185 | 5/1957 | Albrektsson et al. | 210/703 |
| 2,813,074 | 11/1957 | Banks et al. | 210/703 |
| 3,979,293 | 9/1976 | Boulenger | 210/220 |
| 4,086,160 | 4/1978 | Roesler | 210/629 |
| 4,216,085 | 8/1980 | Chittenden | 210/703 |
| 4,230,563 | 10/1980 | Roesler | 210/629 |

OTHER PUBLICATIONS

Proceedings of the 31st Industrial Waste Conference, May 4, 5 and 6, 1976, Purdue University; Ann Arbor Science; pp. 344–351.

*Primary Examiner*—Benoît Castel
*Attorney, Agent, or Firm*—Donald G. Ballantyne

[57] ABSTRACT

In a long vertical shaft activated sludge bioreactor for the treatment of waste water and the flotation/separation of solids therefrom, an improvement is provided whereby fluctuations in flow through the bioreactor are maintained level without the use of complex control mechanisms and whereby separation from the effluent of dispersed air bubbles occurs directly in the flotation/-separation vessel rather than in the shaft or an auxiliary vessel. The improvement provides for the installation of a holding reservoir between the shaft and the flotation/-separation vessel. Influent passes through the reservoir on its way to the bioreactor and some make-up effluent from the flotation/separation vessel is directed into the holding reservoir as the level of liquid in the reservoir falls. In addition, means are provided in the separation/-flotation vessel to split off large dispersed gas bubbles which would otherwise disrupt sludge flotation.

2 Claims, 2 Drawing Figures

U.S. Patent   Jul. 21, 1981   Sheet 2 of 2   4,279,754

MEANS FOR SEPARATION OF GAS AND SOLIDS FROM WASTE MIXED LIQUOR

This invention relates to an improved method and apparatus for treating the mixed liquor produced by a long vertical shaft activated sludge bioreactor process in order to first, separate dispersed gas bubbles therefrom and subsequently to remove suspended solids by flotation and sedimentation.

Long vertical shaft bioreactor suitable for the treatment of waste water by a modified activated sludge process are known, being disclosed, for example, in Canadian Pat. No. 1,033,081 to Bailey et al. Such bioreactors essentially comprise a circulatory system which includes at least two substantially vertical side-by-side chambers communicating with each other at their upper and lower ends, the upper ends being connected through a basin. The waste water for treatment is caused to descend one chamber (the downcomer) and ascend the other chamber (the riser). Normally, the waste-containing liquor, referred to as mixed liquor, is driven through the circulating system by injection of an oxygen-containing gas, usually air, into one or both of the chambers. Typically, in a 500 foot deep reactor, and employing air at a pressure of 100 pounds per square inch, injection will be at a depth of about 200 feet. At start-up of the bioreactor, air injection will be made into the riser in the nature of an air lift pump. However, once circulation of the mixed liquor begins, injection can be into the downcomer only, the fluid in the downcomer having a higher density than the liquid-bubble mixture of the riser thereby providing sufficient lifting force to maintain circulation. Influent waste water is typically introduced into the basin at a position adjacent to the upper end of the downcomer and treated waste is drawn from the basin at a position adjacent to the upper end of the riser. Usually the basin is fitted with a baffle which forces mixed liquor at the top of the riser to traverse a major part of the basin before again ascending the downcomer for further treatment.

The injected oxygen-containing gas dissolves in the mixed liquor as the liquor descends in the downcomer to regions of greater hydrostatic pressure. This dissolved oxygen constitutes the principal reactant in the biochemical degradation of the waste. As the circulating mixed liquor rises in the riser to regions of lower hydrostatic pressure the dissolved gas separates and forms bubbles. When the liquid/bubble mixture from the riser enters the basin gas disengagement occurs. Reaction between waste, dissolved oxygen, nutrients and biomass takes place during circulation through the downcomer, riser, basin system. The products of the reaction are carbon dioxide, and additional biomass which in combination with inert material present in the influent waste water forms a sludge.

The term "waste water" as used herein is understood to include water carrying any type of biodegradable domestic and industrial waste materials, for example, normal domestic waste and the effluents produced by farms, food factories, breweries and other industries. By "mixed liquor" is meant the mixture of liquids and solids present in the bioreactor.

In our copending U.S. application Ser. No. 159,348 (June 13, 1980) entitled "Long Vertical Shaft Bioreactor with Modified Waste Liquor Injection" filed concurrently herewith, there is disclosed a bioreactor wherein influent waste water is introduced at depth into the riser chamber through an upwardly directed outlet arm of an influent conduit. An oxygen-containing gas is injected into the influent in the outlet arm of the influent conduit. In addition to oxygenating the waste the injected gas acts to create a lift pump which draws the influent waste into the bioreactor riser. Effluent is withdrawn from the riser through an effluent conduit having its inlet located in the riser at a point below the outlet of the influent conduit. During operation of the bioreactor of the above-noted application the flow of influent to and effluent from the bioreactor are controlled in response to changes in level of liquid in the connecting upper basin. When the liquid level in the basin rises, a relief valve in the effluent system is opened, allowing effluent to leave the bioreactor. When the liquid level in the basin falls the relief valve is closed, and effluent is directed to the influent conduit.

Effluent withdrawn the bioreactor comprises a mixture of liquid and solids commonly called sludge. Before the treated liquid component can be discharged into a natural water course, the solids component of the sludge must be separated. Separation is commonly carried out in a separation vessel by a combination of flotation and sedimentation. The gas bubbles which cause the solid particles to float to the surface of the mixed liquor directed into the flotation vessel originate from the oxygen-containing gas which is dissolved in the mixed liquor as it circulates through the bioreactor. This dissolved gas comes out of solution in the form of bubbles as the mixed liquor rises to levels of lower hydrostatic pressure. Thus when the effluent stream reaches the surface it will contain dispersed gas bubbles which have already come out of solution, as well as dissolved gas in supersaturated state. Effective flotation of the solids in the sludge requires that the amount of dispersed bubbles, referred to as voidage be minimized. In our copending U.S. application Ser. No. 159,352 (June 13, 1980) entitled "Method for Maintaining a Constant Gas to Solids Ratio in Effluent from a Long Vertical Shaft Bioreactor" and filed concurrently herewith, there is disclosed a cylindrical swirl tank which functions to separate dispersed bubbles from the effluent passing therethrough. The swirl tank also provides for controlling the flow of effluent to the flotation vesse. Although the swirl tank separates dispersed gas bubbles from the mixed liquid and controls flow to the flotation tank, it is not without some disadvantages. Under some conditions the swirl tank may remove an unnecessarily large amount of gas from the effluent adversely effecting subsequent flotation. In addition, the stream of effluent passing through the swirl tank to the flotation vessel must take a downward path before entering the flotation vessel which results in loss of head, and increases hydraulic losses in the bioreactor. The opening and shutting of the effluent control means in the swirl tank also tends to produce a shearing effect and may cause surges in the flowing effluent both of which can result in excessive dissolution of dissolved gas in the mixed liquor.

The above-described disadvantages have been substantially eliminated in the improved method and apparatus of the present invention which method comprises withdrawing the effluent from the riser chamber and discharging the effluent directly into a flotation vessel without passing through any control means. Dispersed bubble separation occurs in the flotation vessel itself. The apparatus of the invention also provides means for controlling the rate of flow of waste influent to the bioreactor.

The improved apparatus for carrying out the method of this invention comprises a long vertical downcomer chamber, and adjacent long vertical riser chamber, a surface basin, the downcomer and riser chambers operatively communicating directly with each other at their lower ends and through the basin at their upper ends to form a circulatory loop, both the downcomer chamber and riser chamber having means for the injection therein at depth of an oxygen-containing gas, a waste influent conduit operatively opening into said riser chamber at a location above the location of the means for injecting oxygen-containing gas into said riser chamber, a treated waste effluent conduit operatively discharging from said riser chamber at a location below the location of means for injecting oxygen-containing gas into said riser chamber, and adjacent to said surface basin a flotation/sedimentation vessel, the improvement comprising a waste influent conduit having its inlet operatively connected to a reservoir located adjacent to said flotation/sedimentation vessel, a treated waste effluent conduit having its outlet operatively connected to said flotation/sedimentation vessel at a position below the normal surface level of liquid in said flotation/sedimentation vessel, said treated waste effluent conduit being slanted upwardly towards the said flotation/sedimentation vessel, a sludge-receiving trough in contact with an upper edge of the said flotation/sedimentation vessel at a position above the outlet of the said effluent conduit, said trough adapted to discharge into said reservoir, a driven upper skimmer adapted to skim flotation solids from the surface of the liquid in the flotation/sedimentation vessel into said sludge receiving trough, a baffle means lying generally parallel to and below the surface of the liquid in the flotation/sedimentation vessel, said baffle serving as a beach over which the said upper skimmer passes when skimming sludge into the said sludge trough, a driven submerged scraper adapted to scrape sedimented solids from the tank bottom, a substantially vertical dispersion plate beneath the said baffle and close to said effluent inlet, said dispersion plate being adapted to direct rising dispersed gas bubbles from said waste effluent toward said sludge-receiving trough, a recycle conduit operatively connecting the bottom of the said reservoir to the bottom of said flotation/sedimentation vessel, and rotating plough means within said flotation/sedimentation vessel and adjacent the said recycle conduit and adapted to direct sedimented solids carried by the said submerged scraper through the said recycle conduit to the said reservoir.

The invention is illustrated by the accompanying drawings wherein

Figure 2:
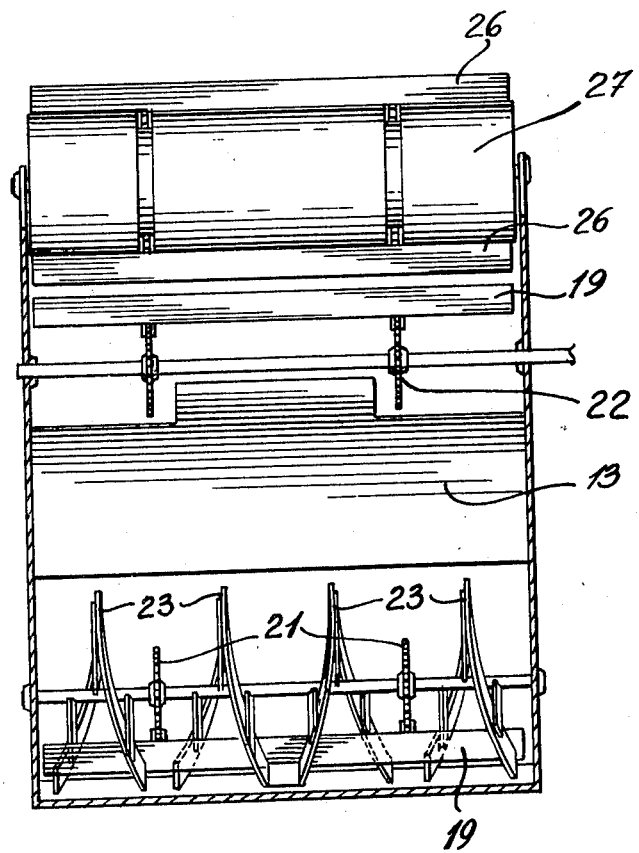

FIG. 1 is a diagrammatic vertical section through a long vertical shaft bioreactor and a connected flotation/sedimentation vessel, and FIG. 2 is a vertical section taken across the influent end of the flotation/sedimentation vessel of FIG. 1.

Referring to drawings where like numbers designate like parts; a downcomer chamber is shown at 1 and a riser chamber at 2. Downcomer 1 and riser 2 are connected together directly at their lower ends and are connected through basin 3 at their upper ends. Downcomer 1, riser 2 and basin 3 thus form a circulating loop. Basin 3 is fitted with baffle 4 which directs the flow of circulating mixed liquor across the breadth of the basin. Wastewater is introduced into the bioreactor through reservoir 5 which discharges into influent waste conduit 6. Conduit 6 discharges into riser chamber 2 through upturned U-shaped arm 7. An oxygen-containing gas, usually air, is injected into the downcomer through sparger 8 and into the upturned arm 7 of influent conduit 6 by sparger 9. Sparger 9 serves both to oxygenate the mixed liquor entering the riser and to act as a lift pump drawing influent waste into riser 2. Waste contained in the mixed liquor is biochemically degraded as it circulates through the bioreactor. Effluent is drawn from riser 2 through waste effluent conduit 10 which has its inlet positioned below the point of discharge of gas into the riser 2. Effluent passes from conduit 10 through upwardly slanted conduit extension 11 to flotation/sedimentation vessel 12.

When the effluent stream enters flotation/sedimentation vessel 12 it is directed upwards by dispersion plate 13 into the generally V-shaped semi-enclosure formed by the sloping underside of triangular shaped wave baffle 14 and end wall 15 of the vessel 12. This semi-enclosure terminates at its upper narrow extremity in an orifice 16. Thus gas bubbles dispersed in the effluent will pass out through orifice 16 to sludge trough 17 carrying with them some of the effluent mixed liquor. Trough 17 in turn discharges into reservoir 5.

Solids falling to the bottom of vessel 12 are carried to the end of vessel 12 by a submerged bottom scraper comprising two endless chains 18 carrying thereon a series of scraper elements 19. Chains 18 pass over sprockets 20, 21 and 22, of which sprocket 22 is motor driven. Mounted on the same shaft as sprocket 21 is a rotating plough screw 23. Rotating screw 23 functions to force solids from the bottom of vessel 12 through bottom recycle conduit 24 into reservoir 5. The rising scraper elements 19 of the bottom scraper serve to stir the effluent as it enters vessel 12 from conduit 11 assisting in the dissolution of dissolved gas. Dispersion plate 13 may be fitted with ultrasonic means to further aid in the dissolution of gas dissolved in the effluent.

Small gas bubbles coming out of solution are not directed towards orifice 16 but instead pass to the main section of vessel 12 where they act to float solids to the surface. The floating solids are skimmed off the surface of the liquid in vessel 12 into sludge trough 17 by a top skimmer comprising endless chains 25 carrying skimmer elements 26. Chains 25 pass over sprockets 27 and 28. Sprocket 27 is motor driven. The top of wave baffle 14 serves as a beach for the skimmer elements 26. Effluent free from sludge passes under vertical baffle 29 and over deflector plate 30 to effluent trough 31. From trough 31 the treated effluent, free from solids, may be discharged into natural water courses.

Recycle conduit 24 in combination with reservoir 5 functions to control the waste influent flow to the bioreactor. As the flow of influent waste to reservoir 5 increases, the head of liquid in reservoir 5 rises, increasing the back pressure against the flow from recycle conduit 24. Thus flow of recycle fluid from flotation/sedimentation vessel 12 to reservoir 5 is reduced resulting in a reduction of flow to waste influent conduit 6. Similarly, a reduction in flow of influent waste to reservoir 5 results in an increase in recycle flow through conduit 24 and a subsequent increase in flow to waste conduit 16.

In operation, effluent from the waste effluent conduit 11 passes into the semi-enclosed space or zone between dispersion plate 13 and end wall 15 of flotation/sedimentation vessel 12. In this zone the effluent containing typically about 3% dispersed gas undergoes dissolution of gas present in supersaturated state. This dissolution comes about through bombardment of dispersed gas bubbles contained in the effluent and through stirring brought about by the passage of the elements 19 of the bottom scraper. In addition, the dispersion plate 13 may be fitted with ultrasonic transducers that have been found effective in causing dissolution of gas. A frequency of 18,000 hertz has been found to be suitable for use in this application. Gas coming out of solution in the form of gross bubbles passes through orifice 16.

It is believed that a recycling of mixed liquor entering flotation/sedimentation vessel 12 takes place following a circular path up and around dispersion plate 13, under baffle 14 and down around rotating plough screw 23 following in general the upward direction of the bottom scraper elements 19. This recycling tends to fractionate the dispersed gas bubbles according to bubble size. As noted heretofore large gas bubbles rise immediately and are ejected through the top orifice 16. Smaller bubbles tend to pass under the baffle 14 and float to the surface in vessel 12. Very minute bubbles tend to pass around the rotating plough screw 23. The direction of this recycle flow is indicated by arrows in FIG. 1. This recycle affects the operation of the flotation/sedimentation vessel 12 in two ways. It reduces the fraction of dispersed gas bubbles in the mixed liquor in the influent zone of vessel 12 since the recycle stream has a lower fraction of dispersed bubbles than the effluent entering vessel 12. It also reduces the equivalent mixed liquor going to flotation/sedimentation vessel 12. The recycle of sedimented sludge and accompanying liquid by rotating plough screw 23 from the bottom flotation/sedimentation vessel 12 to reservoir 5 serves to control the flow of influent to the bioreactor. If the influent waste flow to the reservoir 5 increases, the height of liquid in reservoir 5 increases causing increased back pressure against the recycle from the bottom of the flotation/sedimentation vessel 12. Thus recycle from the bottom of the flotation/sedimentation vessel 12 decreases. With a drop in flow of influent waste to reservoir 5 there is a corresponding increase of recycle from the bottom of flotation/sedimentation vessel 12. In a preferred embodiment baffle 14 is constructed so as to be equivalent to approximately seven times the expected depth of the turbulence at the effluent entry end of flotation/sedimentation vessel 12.

EXAMPLE

A model flotation tank of design identical to that of FIGS. 1 and 2 was constructed of polymethylmethacrylate sheet to allow for observations of the material flows. The model was 18 inches wide, 48 inches long and 24 inches deep and was fitted with top and bottom scrapers, wave baffle (14) dispersion plate (13) and bottom plough (23).

The model was connected to the effluent conduit of an experimental 500 foot deep long vertical shaft bioreactor and a flow of four GPM of waste was introduced into the model. The inflow solids content in the waste was between four and five grams/l. From observation, flow occurred about the dispersion plate and solids separation was achieved under the wave baffle. Gross air bubbles were vented successfully without blockage through orifice 16. The tank was operated successfully throughout a four day test period. The quality of effluent from processed domestic waste taken from the model tank, without the addition of any chemical flotation aids, was equivalent to that from a standard flotation tank where flotation aids were employed. With heavy industrial wastes, only half as much flotation aid was required to produce equivalent quality effluent. With the addition of ultrasonic transducers to the dispersion plate, a substantial improvement in flotation performance was noted particularly in the compaction of the sludge blanket. Observation also showed that flow through recycle conduit 24 functioned satisfactorily in controlling waste influent flow to the bioreactor.

The embodiments of the invention in which an exclusive property or privilege is claimed are defined as follows:

1. The improved apparatus for treating waste mixed liquor comprises a long vertical downcomer chamber, an adjacent long vertical riser chamber, a surface basin, the said downcomer and riser chambers operatively communicating directly with each other at their lower ends and through the basin at their upper ends to form a circulatory loop, the said downcomer chamber and riser chambers having means for the injection therein at depth of an oxygen-containing gas, a waste influent conduit operatively opening into said riser chamber at a location above the location of the means for injecting oxygen-containing gas into said riser chamber, a treated waste effluent conduit operatively discharging from said riser chamber at a location below the location of means for injecting oxygen-containing gas into said riser chamber, and adjacent to said surface basin a flotation/sedimentation vessel, the improvement comprising a waste influent conduit having its inlet operatively connected to a reservoir located adjacent to said flotation/sedimentation vessel, a treated waste effluent conduit having its outlet operatively connected to said flotation/sedimentation vessel at a position below the normal surface level of liquid in said flotation/sedimentation vessel, the said treated waste effluent conduit being slanting upwardly towards the said flotation/sedimentation vessel, a sludge-receiving trough in contact with an upper edge of the said flotation/sedimentation vessel at a position above the outlet of the said effluent conduit, said trough adapted to discharge into said reservoir, a driven upper skimmer adapted to skim floating solids from the surface of the liquid in the said flotation/sedimentation vessel into said sludge-receiving trough, a baffle means lying generally parallel to and below the surface of the liquid in the flotation/sedimentation vessel, said baffle serving as a beach over which the said upper skimmer passes when skimming sludge into the said sludge trough, a driven submerged scraper adapted to scrape sedimented solids from the bottom of said flotation/sedimentation vessel, a substantially vertical dispersion plate beneath the said baffle and close to said effluent inlet, said dispersion plate being adapted to direct rising dispersed gas bubbles liberated from said waste effluent toward said sludge-receiving trough, a recycle conduit operatively connecting the bottom of the said reservoir to the bottom of said flotation-sedimentation vessel, and rotating plough means within said flotation/sedimentation vessel and adjacent said recycle conduit adapted to direct sedimented solids carried by the said submerged scraper through the said recycle conduit to the said reservoir.

2. In a long vertical shaft activated sludge bioreactor treatment method wherein an aerobic biological reaction is caused to take place during the continuous circulation of fluid waste in an apparatus comprising a long vertical downcomer chamber, and adjacent long vertical riser chamber and a surface basin, the said downcomer and riser chambers operatively communicating directly with each other at their lower ends and through the said surface basin at their upper ends to form a circulatory loop, the said downcomer chamber and riser chamber having means for the injection therein at depth of an oxygen-containing gas, a waste influent conduit operatively opening into said riser chamber at a location above the location of the means for injecting oxygen-containing gas into said riser chamber, a waste effluent conduit operatively discharging from said riser chamber at a location below the location of means for injecting oxygen-containing gas into said riser chamber, and adjacent to said surface basin a flotation/sedimentation vessel, an improvement is provided whereby fluctuations in flow of waste through the bioreactor and associated flotation/sedimentation vessel are substantially eliminated, the said improvement comprising receiving both influent and recirculated waste sludge in a holding reservoir adjacent to said flotation/sedimentation vessel, said holding reservoir having a base outlet therein adapted to discharge said waste sludge into said riser chamber, removing floating sludge and liquid effluent from said sludge flotation/separation vessel and discharging said effluent and sludge into said holding reservoir, the rate of discharge of said effluent and sludge into said holding reservoir being dependent on the back pressure exerted by the head of liquid in said holding reservoir.

* * * * *